United States Patent Office 3,207,593
Patented Sept. 21, 1965

3,207,593
CONTROL OF SUBMERSED AQUATIC PLANT LIFE
Harold L. Lindaberry, Aurora, Ill., assignor to Pennsalt Chemicals Corporation, Philadelphia, Pa., a corporation of Pennsylvania
No Drawing.  Filed Nov. 24, 1961, Ser. No. 154,887
8 Claims.  (Cl. 71—2.5)

This invention relates to the control of plant life in ponds, lakes, and other bodies of water and deals particularly with the use of certain long chain amine salts for chemical control of aquatic weeds and algae.

Numerous chemical agents are known to control (i.e. kill or inhibit) aquatic plant growth, but each agent has disadvantages which limit its usage. For example, there are many potent algicides which cannot be used because at useful concentrations they are extremely toxic to fish. On the other hand, some agents may effectively control one species of aquatic plant life and be of little or no value with others. Still other agents are known which have limited utility because of their high cost (e.g. silver compounds). Thus, there exists the need for improved means to effectively control the many varieties of undesirable weeds, fungi, and algae existing in ponds, lakes, streams, etc.

It is known that the disodium salt of endothal (e.g. 3,6-endoxohexahydrophthalic acid) can be used for aquatic weed control. This compound is quite effective and is relatively non-toxic to fish, but it is somewhat slow in its action. It is, of course, desirable that algicides act quickly and fast action also aids to avoid loss by chemical degradation as well as diffusion due to water currents and/or weather conditions.

It has now been found in accord with this invention that aquatic plant life can be effectively controlled by use, at low concentrations, of novel amine salts of a 3,6-endoxohydro-orthophthalic acid, wherein said amine salt radical is derived from an amine which is a tertiary alkyl amine having the structure

where $R_1$ is an aliphatic hydrocarbon group containing from 12 to 18 carbon atoms, and $R_2$ and $R_3$ are lower alkyl radicals which may be the same or different (e.g. methyl, ethyl, propyl, butyl).

The 3,6-endoxohydro-orthophthalic acid salts useful in this invention will have less than three double bonds in the endoxocarboxylic acid ring, but may have all three degrees of ring saturation and thus will include 3,6-endoxodihydroorthophthalic acids (e.g.

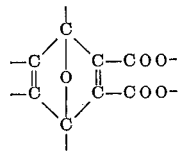

3,6-endoxotetrahydro-orthophthalic acids, (e.g.

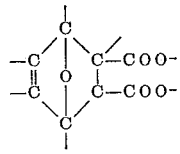

and

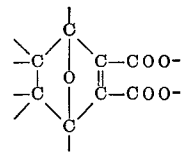

and 3,6-endoxohexahydro-orthophthalic acids (e.g.

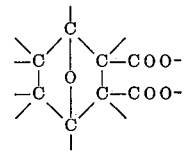

In this group, the latter compounds (i.e. the hexahydro compounds) generally have greater activity and are the preferred anions to be used.

It will be understood that all of the 3,6-endoxohydrophthalic acids and anhydrides may be used to form salts with the tertiary amines defined above to give the compounds useful in this invention. Where anhydrides are used, a mole of water must be used, of course, to cause hydrolysis to the dibasic acid. In addition to the unsubstituted acids, monovalent radical substituted derivatives may be used and such substituents will include halogens (e.g. chlorine, bromine, etc.), lower alkyl, lower alkoxy, lower aryl, lower aryloxy, nitro, cyano, haloalkyl (e.g. trifluoromethyl) and like groups. The substituted acids from which the salts useful in this invention are derived are described and their preparation given in U.S. 2,576,080.

As indicated, the amines from which salts of the above 3,6-endoxohydroorthophthalic acids are derived will be tertiary alkyl amines. These aliphatic amines may be derived from the well known aliphatic hydrocarbon amines obtained by reductive amination of the acids from animal fats and vegetable oils, particularly tallow and coconut acids which have predominantly 12 to 18 carbon atoms in the chains. Of particular value for this invention are coconut oil amines (predominantly twelve and fourteen carbon atoms) which have been converted to tertiary amines by alkylation. However, other tertiary amines within the above structural configuration are also operable in this invention and such amines may be obtained by the amination and subsequent alkylation of oleic, linoleic, tallow, and soya acids. Alternatively, these tertiary amines may be obtained by conversion of the acids to an amide with a di-lower alkyl secondary amine followed by reduction of the carbonyl group. Specific amines which may be used to form the salts useful in this invention include N,N-dimethyllaurylamine, N,N-diethylmyristylamine, N,N - di - propylstearylamine and the like. However, because of availability and cost, mixtures of amines will preferably be used such as the mixtures found in N,N-dimethylcocoamine, N,N-dimethylsoyaamine, etc. The methods of making these amines are well known, the various processes being disclosed in the book by Astle entitled Industrial Organic Nitrogen Compounds (Reinhold, 1961).

The preparation of the amine salts of the 3,6-endoxohydrophthalic acids is readily carried out, without need of critical controls, simply by contacting the desired amine with a stoichiometric amount of the desired 3,6-endoxohydrophthalic acid or anhydride. The temperature for the reaction will usually be held between about 30° and 90° C. and the process is completed in a short time. It will be understood that both the mono- or ditertiary amine salts of the acid or anhydride may be prepared and used in this invention. To prepare the monosalt the stoichiometric amount of amine used will simply be one-half required for the dibasic salt. The techniques which may be used to prepare these compounds are also disclosed in U.S. 2,576,082.

The novel compounds use in this invention when made from commercial amines are generally clear or slightly turbid tan or brown oils or syrups which do not readily lend themselves to crystallization. This resistance to crystallization is probably due to the fact that the commercial amines used to form the salts are comprised of more than one discrete amine species and such a mixture makes crystallization impossible. However, this is not important because the amine salt oil obtained as product is simply dissolved in a suitable solvent for use. When individual specific amines are used for salt formation, however, the products are waxy or soap-like solids. The products used in this invention are readily soluble in water, ethanol and other alcohols, benzene, toluene, xylene and other aromatic hydrocarbons, diethyl ether, diacetone alcohol, etc. They are, however, insoluble in hexane and similar aliphatic hydrocarbon solvents.

The compounds described above act as a contact poison and for this reason, aquatic weed control is achieved quickly simply by treating the area with sufficient material to maintain a given strength of active ingredient in the water surrounding the exposed tissue surface area of the plant. The activity of the above described compounds is so high that satisfactory control is obtained with a concentration of less than one part per million of active ingredient in solution in the water surrounding the plants. For most applications where an entire area such as a pond or lake is treated, concentrations of about 0.05 to 0.5 p.p.m. will be quite effective with no harm to fish. The preferred concentration range which is harmless to fish will usually be between about 0.25 to 0.5 p.p.m. Concentrations as high as .75 p.p.m. in water has been observed to be safe to fish under field conditions. For resistant weeds where no fish are present a dosage of up to about 3 p.p.m. may be employed.

The manner in which the water area may be treated will vary with the specific problems encountered. Since the active ingredient is water soluble it will diffuse out from the area treated. However, in this invention this is not serious because of the very fast action of the agents. In treating small areas where the weed problem is usually critical around the edge of the pond it is more practical to treat the marginal area from the bank than to treat from the center. Futhermore, because of the diffusion of the agents toward the center in static water, control will be obtained there also. Although aqueous solutions are usually preferred for economic reasons, solutions of the amine salts in other solvents may be used and such solutions used for the water treatment.

Treatment is accomplished best by spraying on the water or by injection just below the water surface with distribution as evenly as possible in the area to be treated. Spraying equipment is preferably used with aqueous solutions and because the agent is applied as an aqueous solution no problem of preparation, operation or cleaning is involved. In general, the dilute treating solution will contain about 10% to about 25% by weight of active ingredient. Although the product is water soluble at the concentrations used, it may frequently be desirable to incorporate a small amount of a dispersant as a mixing aid in the initial concentrate used to prepare the diluted treating solutions. For this purpose isopropyl alcohol, diacetone alcohol or other water soluble alcohols or ketones may be used. Where a dispersant is used the formulated concentrate will usually contain from about 15% to 30% of the dispersing agent. In order to aid in the estimation of the gallonage of a 20% active aqueous solution for various pond sizes the following table is given:

TABLE I.—APPROXIMATE GALLONS OF 20% ACTIVE AGENT CONCENTRATE NEEDED TO TREAT ONE ACRE OF POND SURFACE (APPROX. 208' BY 208')

| Pond depth, ft. | For dosage of— | |
|---|---|---|
| | 0.5 p.p.m. | 1.0 p.p.m. |
| | Gals. | Gals. |
| 1 | 0.65 | 1.3 |
| 2 | 1.3 | 2.6 |
| 3 | 1.95 | 3.9 |
| 4 | 2.6 | 5.2 |
| 5 | 3.25 | 6.5 |
| 6 | 3.9 | 7.8 |

As is evident from the table the concentrations and depths are directly proportional and other concentrations and depth requirements may be calculated accordingly.

In addition to treating the area with a solution by a spraying technique the treating agents may also be formulated in a granular form and applied by any of the variety of manual, electrical and gas-powered whirling spreaders on the market and which can be adapted for use on boats. This granular formulation consists of an approximately 1% to 10% (preferably about 5%) concentration of active agent deposited on any inert material such as Attapulgite, Bentonite and other inert adsorbent granulated clays having a size range of about 8 to 30 mesh (U.S. sieve size).

The granular formulations can be simply prepared by spraying the liquid active ingredient or concentrates thereof into the granular inert carrier in a rotating or other suitable blender common to the trade for preparation of pesticide formulations. Although the granulated formulations can be prepared containing from 1 to 25% of active ingredient it has been found that 5% of the active ingredient is generally the best concentration to use for obtaining good distribution when the formulation is applied. To treat one acre of water surface with a 5% by weight granular formulation at a level of one part per million of active agent will require 55 pounds of the granular material for each foot of pond depth. Since again the depth of pond and the dose concentration are directly proportional, the amount of granular material for other depths and at other concentrations may be readily calculated. Use of a granular formulation is advantageous for control of submerged algae since the granular agent sinks to the bottom of the pound.

As indicated, the active agents described above are effective in accord with this invention for the control of plant life in aquatic systems. One of the particular advantages of the invention is that it enables a wide variety of plant life to be controlled with a single active ingredient, i.e. the agents have broad spectrum activity. The salts as described above are effective against practically all aquatic plants and growth which cause problems on lakes, ponds, rivers, streams, etc. Thus the invention is useful in controlling pondweeds (Potamogeton spp.), including bassweed, curly leaf pondweed, floating-leaf pondweed, sago pondweed, flat-stem pondweed, bushy pondweed (Naias spp.), horned pondweed (Zannichellia sp.), coontail (Ceratophyllum sp.), water milfoil (Myriophyllum spp.), mud plantain and water stargrass (Heteranthera spp.), bladderwort (Utricularia spp.), burr weed (Sparganium spp.), tapegrass, wild celery, eelgrass (Vallisneria sp.), waterweed (Elodea spp.), members of the duckweed family, such as big duckweed (Spirodella sp.), duckweed (Lemna spp.), watermeal (Wolffia spp. Wolffiella sp.), stonewort, muskgrass (Chara spp.) and the filamentous green algae known as pond scum (Cladophora, Spirogyra, Pithophora, Rhizoclonium, Ulothrix). In addition, the invention is useful for the control of slime causing bacteria, such as *Aerobacter aerogenes*, *Bacillus mycoides*, *Pseudomonas aeruginosa*. Also of interest is the use of the above materials to control the sub-tropical marine algae *Gymnodinium brevis*, which causes the red tide disease in fish.

In addition to use in ponds and lakes, this invention is applicable to the control of algae and slime forming bacteria in cooling towers and other water recirculating systems as used in paper manufacturing processes for example, in drainage ditches and other water flowing sites.

In order to more fully describe and illustrate the invention, the following examples are given:

EXAMPLES

[All parts given are parts by weight]

Example 1

A reaction vessel was charged in order with 559 parts (2.62 moles) of N,N-dimethylcocoamine (chain length distribution: 49% $C_{12}$, 17% $C_{14}$, 9% $C_{16}$, 10% $C_{18}$, balance $C_8$ and $C_{10}$), 62 parts of water, 69 parts (2.16 moles) of methanol, and 190 parts (1.14 moles) of 3,6-endoxo-$\Delta$-4-tetrahydro-orthophthalic anhydride. As stirring occurred a slight temperature rise to about 35° C. was noted. The product at this point was the amine salt of the acid obtained from the hydrolysis of the anhydride. Then 3 parts of Raney nickel and 20 parts of methanol were added and hydrogen pressured in at 150 p.s.i.g. for two hours to reduce the double bond and thus convert the tetrahydro-orthophthalic acid moiety to a hexahydrophthalic acid. The temperature during the hydrogenation rose to 38° C. After cooling, the product obtained was an 83% aqueous methanol solution of dimethyl cocoamine salt of 3,6-endoxohexahydro-orthophthalic acid.

The above product was diluted with water to a concentration of 21% and was ready for use. Additionally, a 72% solution of the salt in diacetone alcohol was prepared which is diluted with water to 20% for use in the field.

The compound of Example 1 before reduction and the dimethylcocoamine salt of 3,6-endoxohexahydrophthalic acid were evaluated against Chlorella (Wisconsin strain). The data obtained together with a comparison of the effectiveness of a conventional quaternary ammonium algicide are shown in Table II.

TABLE II.—CHLORELLA TOXICITY TESTS

Organism_____ Chlorella (Wisconsin strain).
Initial concentration_____ 300,000 cells/ml.
48-hour concentration (control)__ 3,250,000 cells/ml.
Medium_____ Allen's pH (25 ml./50 ml. Erlenmeyer).

| Chemical | Concentration, parts per million in water treated | Percent Kill | |
|---|---|---|---|
| | | Test 1 (7 days) | Test 2 (5 days) |
| Cetyl trimethyl ammonium bromide | 0.5 | 0 | 0 |
| | 0.75 | 50 | 50 |
| | 1.0 | 100 | 75 |
| | 1.25 | 100 | 100 |
| Di-dimethylcocoamine salt of 3,6-endoxohexahydro-orthophthalic acid | 0.1 | 0 | 50 |
| | 0.2 | 75 | 90 |
| | 0.3 | 100 | 100 |
| | 0.4 | 100 | 100 |
| Di-dimethylcocoamine salt of 3,6-endoxo-$\Delta$-4-tetrahydro-orthophthalic acid | 0.1 | 50 | 75 |
| | 0.2 | 90 | 90 |
| | 0.3 | 100 | 100 |
| | 0.4 | 100 | 100 |

Example 2

The di-dimethylcocoamine salt of 3,6-endoxohexahydro-orthophthalic acid was evaluated as an algicide at various concentrations against numerous species of algae. Table III indicates the data obtained:

TABLE III.—EFFECTIVE CONCENTRATIONS OF THE DIMETHYLCOCOAMINE SALT OF 3,6-ENDOXOHEXAHYDRO-ORTHOPHTHALIC ACID AGAINST VARIOUS AQUATIC ORGANISMS

| Aquatic Organism | Observations on Effective Concentration |
|---|---|
| Pondweeds:<br>*Potamogeton deversi folius*<br>*P. foliosus*<br>*P. nodosus*<br>*Najas flexilis* | Effects noticed at 0.01 p.p.m. Control obtained at 0.05–0.10 p.p.m. |
| Filamentous algae:<br>Cladophora<br>Pithophora<br>Spirogyra | Variable response obtained at 0.03 to 0.05 p.p.m. Complete toxicity obtained at 0.1 to 0.5 p.p.m. even in cold water (55° F.) |
| Muskgrass (*Chara vulgaris*)<br>Waterweed (*Elodea canadensis*)<br>False loosestrife (*Ludwigia palustris*) | Temporary control achieved at 0.1 p.p.m. |
| Emergent species:<br>Jussiaea (Water Primrose)<br>Duckweed (*Lemna minor*)<br>Sweetflag (*Acorus calamus*) | Spray application at 0.5 to 1.0 p.p.m. gave effective control. |

Example 3

Following the details of Example 1, but using one-half the amount of N,N-dimethylcocoamine, the mono-dimethylcocoamine salt of 3,6-endoxohexahydro-orthophthalic acid was prepared. This compound in aqueous solution at 0.4 p.p.m. killed the subtropical marine algae (*Gyrodinium brevis*) which causes the red tide disease of fish.

Example 4

The slime causing bacteria *Aerobacter aerogenes* and *Bacillus mycoides* were completely killed in laboratory culture tests at 0.5 and 1 p.p.m. respectively of the compound of Example 1.

Example 5

Instead of using N,N-dimethylcocoamine in Example 1, a tallowamine (26% $C_{16}$ and 72% $C_{18}$) is alkylated with a tertiary amine mixture. Two moles of this product reacted with one mole of 3,6-endoxodihydro-orthophthalic acid yields the salt, which is found to inhibit growth of *Elodea canadenis*, *Potomogeton pectinatus*, and *Potomogeton crispus* at 0.16 and 0.32 p.p.m.

Example 6

The effect of the diemethyl cocoamine salt of 3,6-endoxohydro-orthophthalic acid (the product of Example 1) on submersed weeds was evaluated and compared with the disodium salt of 3,6-endoxohexahydro-orthophthalic acid (Endothal). In order to obtain comparative results in a short time, high concentrations of agent were used in the test. Table IV indicates the test concentrations and results:

TABLE IV.—TIME VS. CONCENTRATION EVALUATIONS WITH SUBMERSED WEEDS

[*Najas guadalupensis*, southern naiad—Averages of 3 replicate tests given in percent kill]

| Chemical | Conc. in water, p.p.m. | Exposure Time in Hours | | | | | |
|---|---|---|---|---|---|---|---|
| | | 0.5 | 1.0 | 2.0 | 4.0 | 24.0 | 336.0 |
| Disodium salt of 3,6-endoxohexahydro-orthophthalic acid | 1.0 | ---- | 22 | 18 | 25 | 35 | 80 |
| | 2.5 | 18 | 33 | 28 | 22 | 45 | 99 |
| | 5.0 | 15 | 20 | 40 | 45 | 67 | 100 |
| | 10.0 | 28 | 32 | 36 | 40 | 77 | 100 |
| Dimethylcocoamine salt of 3,6-endoxohexahydro-orthophthalic acid | 1.0 | ---- | 25 | 27 | 49 | 81 | 100 |
| | 2.5 | 37 | 65 | 79 | 79 | 100 | 100 |
| | 5.0 | 83 | 73 | 86 | 90 | 100 | 100 |
| | 10.0 | 97 | 99 | 99 | 100 | 100 | 100 |

It is clear from the above table that the tertiary amine salt of this invention is much faster acting than Endothal. This permits aquatic weed control either in a shorter time at a given concentration or a lower concentration of active agent for control in a given time.

Example 7

To 2.4 g. (1.01 mole) of 4,5-dichloro-3,6-endoxohexahydro-orthophthalic anhydride there was added 4.3 g. (0.02 mole) of dimethylcocoamine and the components thoroughly mixed. Then, with stirring being continued 0.18 g. (0.01 mole) of water was added and a temperature rise from room temperature to 40° to 50° C. was noted. The clear, tan colored syrup obtained was the desired product; di-dimethylcocoamine salt of 4,5-dichloro-3,6-endoxohexahydrophthalic acid which was soluble in water, diethyl ether, benzene and diacetone alcohol, but insoluable in hexane.

The above product was evaluated against coontail (Ceratophyllum sp.) and was found to give 100% control at 0.5 part per million.

Example 8

Instead of using the N,N-dimethylcocoamine salt in Example 2, the N,N-dimethylsoyaamine salt may be used with equal effectiveness.

Likewise the N,N'-dimethylstearyl amine salt may be used with essentially the same results.

Example 9

The following non-aqueous formulations using the di-dimethylcocoamine salt of 3,6-endoxohexahydro-orthophthalic acid as active agent were prepared and successfully used against aquatic weeds:

|  | Percent by Weight | Sp. Gr. of Solution |
|---|---|---|
| Active agent | 72.4 | .950 |
| Diacetone alcohol | 27.6 | |
| Active agent | 36.2 | .901 |
| Heavy aromatic naphtha | 33.2 | |
| Xylene | 30.6 | |
| Active agent | 55.0 | .935 |
| Diacetone alcohol | 17.5 | |
| Heavy aromatic naphtha | 27.5 | |
| Active agent | 49.4 | .897 |
| Heavy aromatic naphtha | 14.5 | |
| Xylene | 30.4 | |
| Butyl alcohol | 5.6 | |
| Active agent | 49.5 | .900 |
| Heavy aromatic naphtha | 16.7 | |
| Xylene | 34.0 | |

The novel compounds of this invention also have utility as soil fungicides. This is demonstrated by the following example:

Example 10

The di-dimethylcocoamine salt of 3,6-endoxohexahydro-orthophthalic acid was applied to soil at a concentration of 10 parts per million and the soil so treated showed activity against *Phytophthora cactorum*, *P. cinnamoni*, and *P. citrophthora*. Seedlings planted in the treated soil showed better emergence than seedlings planted in untreated soil, thus further illustrating the effective soil antifungal activity of the compound.

Example 11

Following the general details of Example 1 the N,N-dimethylcocoamine salt of 3,6-endoxodihydro-orthophthalic acid is prepared, the 3,6-endoxodihydro-orthophthalic acid being obtained by the condensation of acetylenedicarboxylic acid and furan in the usual Diels-Alder type condensation. This salt also shows activity against aquatic weeds.

It will be understood that the above description and examples are not to be considered as limiting the invention and that numerous departures may be made from the above without departing from the spirit and scope of the invention.

I claim:

1. A process to inhibit submersed aquatic plant life which comprises contacting said plant life with an inhibiting amount of a tertiary amine salt of 3,6-endoxohydro-orthophthalic acid, said tertiary amine having the structure

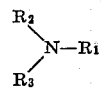

where $R_1$ is an alphatic hydrocarbon group containing from 12 to 18 carbon atoms and $R_2$ and $R_3$ are lower alkyl.

2. A process as in claim 1 wherein the concentration of the 3,6-endoxohydro-orthophthalic acid salt is from about 0.05 to 5 parts per million parts of water surrounding the plants.

3. A process as in claim 1 wherein the salt is an N,N-dimethylcocoamine salt.

4. A process as in claim 3 wherein the salt is the di-dimethylcocoamine salt 3,6 - endoxohexahydro-orthophthalic acid.

5. A process as in claim 3 wherein the salt is the mono-dimethylcocoamine salt of 3,6-endoxohexahydro-orthophthalic acid.

6. A process as in claim 1 wherein the salt is the di-methylcocoamine salt of 3,6-endoxo-Δ-4-tetrahydro-orthophthalic acid.

7. A process as in claim 1 wherein the salt is the di-methylcocoamine salt of 4,5-dichloro-3,6-endoxohexahydro-orthophthalic acid.

8. A process as in claim 1 wherein the amine is derived from soyamine.

References Cited by the Examiner

UNITED STATES PATENTS

| 2,550,494 | 4/51 | Olin | 260—346.2 |
| 2,576,080 | 11/51 | Tischler et al. | 71—2.5 |
| 2,576,081 | 11/51 | Tischler et al. | 71—2.5 |
| 2,576,082 | 11/51 | Tischler et al. | 71—2.5 |
| 2,866,794 | 12/58 | Cords | 260—246.2 |
| 2,900,411 | 8/59 | Harwood et al. | 71—2.5 X |
| 3,097,088 | 7/63 | Reck et al. | 71—2.5 |

JULIAN S. LEVITT, *Primary Examiner.*

MAURICE A. BRINDISI, LEWIS GOTTS, *Examiners.*